United States Patent
Kamatani et al.

(10) Patent No.: US 12,472,924 B2
(45) Date of Patent: Nov. 18, 2025

(54) VEHICLE MOVING APPARATUS WITH ENGINE START DETERMINATION VALUES AND ENGINE POWER LIMITATION FOR MOVING CONTROL

(71) Applicant: TOYOTA JIDOSHA KABUSHIKI KAISHA, Toyota (JP)

(72) Inventors: Hideki Kamatani, Nagoya (JP); Yusuke Tsuzuki, Toyota (JP); Takahiro Nakano, Tokyo (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 247 days.

(21) Appl. No.: 18/352,621

(22) Filed: Jul. 14, 2023

(65) Prior Publication Data
US 2024/0123969 A1     Apr. 18, 2024

(30) Foreign Application Priority Data
Oct. 13, 2022   (JP) .................................. 2022-164821

(51) Int. Cl.
*B60W 20/10*     (2016.01)
*B60W 10/06*     (2006.01)
*B60W 10/08*     (2006.01)
*B60W 30/16*     (2020.01)
*B60W 40/06*     (2012.01)

(52) U.S. Cl.
CPC ............ *B60W 20/10* (2013.01); *B60W 10/06* (2013.01); *B60W 10/08* (2013.01); *B60W 30/16* (2013.01); *B60W 40/06* (2013.01); *B60W 2554/80* (2020.02)

(58) Field of Classification Search
CPC ...... B60W 20/10; B60W 10/06; B60W 10/08; B60W 30/16; B60W 40/06; B60W 2554/80; B60W 20/40; B60W 30/18072; Y02T 10/62
See application file for complete search history.

(56) References Cited

U.S. PATENT DOCUMENTS

| | | |
|---|---|---|
| 8,355,851 B2 | 1/2013 | Inoue et al. |
| 8,370,040 B2 | 2/2013 | Inoue et al. |
| 8,417,430 B2 | 4/2013 | Saeki |
| 8,548,709 B2 | 10/2013 | Morita |
| 8,768,597 B2 | 7/2014 | Kagawa |

(Continued)

FOREIGN PATENT DOCUMENTS

| | | | |
|---|---|---|---|
| JP | 2021-54111 A | | 4/2021 |
| JP | 2021054111 A | * | 4/2021 |

*Primary Examiner* — Aniss Chad
*Assistant Examiner* — Nikki Marie M Molina
(74) *Attorney, Agent, or Firm* — Sughrue Mion, PLLC (57) ABSTRACT

A vehicle moving apparatus executes a moving control to autonomously move a vehicle by controlling power output from an internal combustion engine and an electric motor. The moving control maintains an index value expressing a moving state within a predetermined range and decelerates the vehicle by causing the vehicle to coast. The apparatus uses a second start determination value that is smaller than a first start determination value when the moving control is executed, and limits power output from the internal combustion engine until exhaust gas recirculation control starts, which allows the power to move the vehicle to be output at high energy efficiency during autonomous moving control.

8 Claims, 6 Drawing Sheets

(56) References Cited

U.S. PATENT DOCUMENTS

| | | | |
|---|---|---|---|
| 9,174,643 B2 | 11/2015 | Aso | |
| 10,017,178 B2 | 7/2018 | Morimoto et al. | |
| 10,118,617 B2 | 11/2018 | Urano et al. | |
| 10,486,698 B2 | 11/2019 | Masui et al. | |
| 2014/0257669 A1* | 9/2014 | Wu | F02D 41/021 |
| | | | 701/102 |
| 2014/0297077 A1* | 10/2014 | Kishida | B60W 20/13 |
| | | | 180/65.265 |
| 2014/0335994 A1* | 11/2014 | Otake | B60W 30/181 |
| | | | 477/3 |
| 2018/0297580 A1* | 10/2018 | Kohno | B60W 20/11 |
| 2019/0295419 A1 | 9/2019 | Tosa et al. | |
| 2020/0086749 A1* | 3/2020 | Suzuki | B60L 50/61 |

* cited by examiner

VEHICLE MOVING APPARATUS WITH ENGINE START DETERMINATION VALUES AND ENGINE POWER LIMITATION FOR MOVING CONTROL

CROSS-REFERENCE TO RELATED APPLICATIONS

This application claims priority to Japanese patent application No. JP 2022-164821 filed on Oct. 13, 2022, the content of which is hereby incorporated by reference in its entirety.

BACKGROUND

Field

The invention relates to a vehicle moving apparatus.

Description of the Related Art

There is known a hybrid vehicle which is moved by an engine power and a motor power. The engine power is a power output from an internal combustion engine of a driving apparatus. The motor power is a power output from an electric motor of the driving apparatus. When a requested power is relatively great, the hybrid vehicle is moved by the engine power and the motor power. On the other hand, when the requested power is relatively small, the hybrid vehicle is moved only by the motor power. Therefore, the internal combustion engine of the hybrid vehicle starts to be activated when the requested power increases to a predetermined value or an engine start determination value. On the other hand, when the requested power decreases to a predetermined value or an engine stop determination value, the internal combustion engine is deactivated. Also, there is known a hybrid vehicle in which the internal combustion engine is activated at an optimum activation point or an activation point near the optimum activation point. The optimum activation point is an activation point at which a fuel consumption of the internal combustion engine is smallest. The activation point is a point defined by a rotation speed of the internal combustion engine and a load of the internal combustion engine.

Further, there is known a vehicle moving apparatus which sets the engine stop determination value to a value smaller than the engine start determination value in order to prevent a frequent switching between an activation and a deactivation of the internal combustion engine of the hybrid vehicle. Also, there is known a vehicle moving apparatus which performs an automatic driving to autonomously move the hybrid vehicle by autonomously controlling an acceleration and a deceleration of the hybrid vehicle.

Further, in the hybrid vehicle, the requested power changes to a small extent when the automatic driving is performed, compared with when a manual driving is performed. Therefore, when the automatic driving is performed, a frequency of switching between the activation and the deactivation of the internal combustion engine may fall in a permitted range even when a difference or a hysteresis between the engine start determination value and the engine stop determination value is small, compared with when the manual driving is performed. In this regard, there is known a vehicle moving apparatus which sets the small hysteresis by setting the great engine stop determination value when the automatic driving is performed, compared with when the manual driving is performed (for example, see JP 2021-54111 A1).

In the hybrid vehicle, the great engine start determination value has a benefit to prevent the frequent switching between the activation and the deactivation of the internal combustion engine. On the other hand, when the engine start determination value is set to a great value, the internal combustion engine is not activated, and only the electric motor needs to output the power corresponding to the requested power although the internal combustion engine can be activated at the optimum activation point and output the power to move the vehicle at a high energy efficiency. In this case, the driving apparatus is activated at the low energy efficiency.

SUMMARY

An object of the invention is to provide a vehicle moving apparatus which activates and deactivate the internal combustion engine, depending on the requested power and can output the power to move the vehicle at the high energy efficiency.

A vehicle moving apparatus according to the invention comprises an electronic control unit configured to execute a moving control to autonomously move a vehicle by controlling a power output from an internal combustion engine and an electric motor. The moving control is a control to control the power to maintain an index value expressing a moving state of the vehicle within a predetermined range and decelerate the vehicle by causing the vehicle to coast when the vehicle is requested to be decelerated. When the vehicle is requested to be accelerated while the moving control is not executed, the electronic control unit is configured to accelerate the vehicle by keeping the internal combustion engine deactivated and activating the electric motor while a requested power is smaller than a first start determination value, and start to activate the internal combustion engine to accelerate the vehicle when the requested power reaches the first start determination value. When the vehicle is requested to be accelerated while the moving control is executed, the electronic control unit configured to accelerate the vehicle by keeping the internal combustion engine deactivated and activating the electric motor while the requested power is smaller than a second start determination value, and start to activate the internal combustion engine to accelerate the vehicle when the requested power reaches the second start determination value. The second start determination value is smaller than the first start determination value.

With the vehicle moving apparatus according to the invention, while the moving control to use causing the vehicle to coast in order to decelerate the vehicle, is executed, the internal combustion engine starts to be activated even when the requested power is small, compared with when the moving control is not executed.

Thus, a manner of moving the vehicle by the moving control changes from a manner only using the electric motor to a manner using both of the internal combustion engine and the electric motor when the requested power is relatively small. Therefore, the power to move the vehicle can be output at a high energy efficiency.

According to an aspect of the invention the electronic control unit may configured to limit the power output from the internal combustion engine to a value equal to or smaller than a predetermined upper limit value until the electronic control unit starts to execute an exhaust gas recirculation control to recirculate an exhaust gas to the internal combustion engine after the electronic control unit starts to activate the internal combustion engine while the moving control is executed.

When the power output from the internal combustion engine increases while the exhaust gas recirculation control is not executed, the energy efficiency of outputting the power to move the vehicle, decreases. With the vehicle moving apparatus according to this aspect of the invention, the power output from the internal combustion engine is limited to the value equal to or smaller than the predetermined upper limit value until the exhaust gas recirculation control starts to be executed. Therefore, the energy efficiency of outputting the power to move the vehicle can be maintained great.

According to another aspect of the invention, the predetermined upper limit value may be set, based on the moving state of the vehicle.

The predetermined upper limit value limits the power output from the internal combustion engine. The power requested for the internal combustion engine to output, depends on the moving state of the vehicle. Therefore, the predetermined upper limit value should be set, depending on the moving state of the vehicle. With the vehicle moving apparatus according to this aspect of the invention, the predetermined upper limit value is set, based on the moving state of the vehicle. Thus, the predetermined upper limit value can be suitably set.

According to further another aspect of the invention, the moving state may include information on an inter-vehicle distance which is a distance between the vehicle and a preceding vehicle. In this aspect, the predetermined upper limit value set when the inter-vehicle distance is smaller than a predetermined inter-vehicle distance, may be smaller than the predetermined upper limit value set when the inter-vehicle distance is equal to or greater than the predetermined inter-vehicle distance.

When the inter-vehicle distance is small, a probability that the vehicle is accelerated for a long time, is small. Therefore, the power to be output from the internal combustion engine to accelerate the vehicle, is small. In this regard, when the power output from the internal combustion engine is decreased, the energy efficiency of the internal combustion engine is improved. With the vehicle moving apparatus according to this aspect of the invention, when the inter-vehicle distance is small and thus, the probability that the vehicle is accelerated for a long time, is small, the predetermined upper limit value is set to a small value. Thereby, the power output from the internal combustion engine is limited to a small value. Thus, the energy efficiency of the internal combustion engine can be improved.

According to further another aspect of the invention the moving state may include information on whether the vehicle moves along a downward slope. In this aspect, the predetermined upper limit value set when the vehicle moves on the downward slope, may be smaller than the predetermined upper limit value set when the vehicle does not move on the downward slope.

When the vehicle moves on the downward slope, the probability that the vehicle is accelerated for a long time, is small. Therefore, the power to be output from the internal combustion engine to accelerate the vehicle, is small. In this regard, when the power output from the internal combustion engine is decreased, the energy efficiency of the internal combustion engine is improved. With the vehicle moving apparatus according to this aspect of the invention, when the vehicle moves on the downward slope and thus, the probability that the vehicle is accelerated for a long time, is small, the predetermined upper limit value is set to a small value. Thereby, the power output from the internal combustion engine is limited to a small value. Thus, the energy efficiency of the internal combustion engine can be improved.

Elements of the invention are not limited to elements of embodiments and modified examples of the invention described with reference to the drawings. The other objects, features and accompanied advantages of the invention can be easily understood from the embodiments and the modified examples of the invention.

DESCRIPTION OF THE EMBODIMENTS

Figure 1:
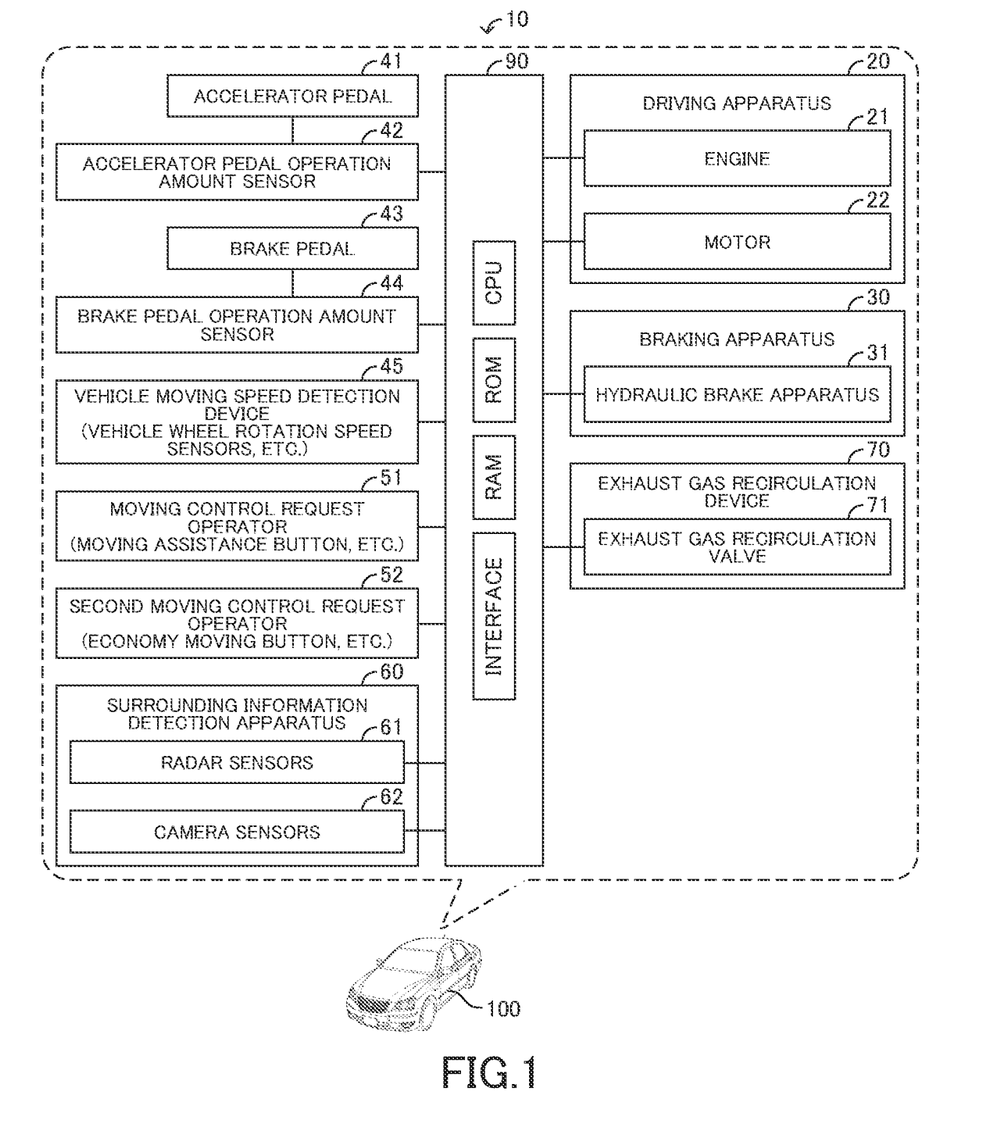
FIG. 1 is a view which shows a vehicle moving apparatus according to an embodiment of the invention.

Below, a vehicle moving apparatus according to an embodiment of the invention will be described with reference to the drawings. As shown in FIG. 1, the vehicle moving apparatus 10 according to the embodiment of the invention is installed on a vehicle or an own vehicle 100. The vehicle moving apparatus 10 includes an ECU 90, i.e., an electronic control unit.

The vehicle moving apparatus 10 is configured to execute a moving control or an automatic driving control. The moving control is a control to accelerate and decelerate the own vehicle 100 to move the own vehicle 100 by autonomously controlling a driving apparatus 20 and a braking apparatus 30. In this embodiment, the moving control includes a moving speed control and an inter-vehicle distance control. Further, in this embodiment, the driving apparatus 20 includes an internal combustion engine 21 and an electric motor 22. Furthermore, the braking apparatus 30 includes a hydraulic brake apparatus 31.

Figure 2A:
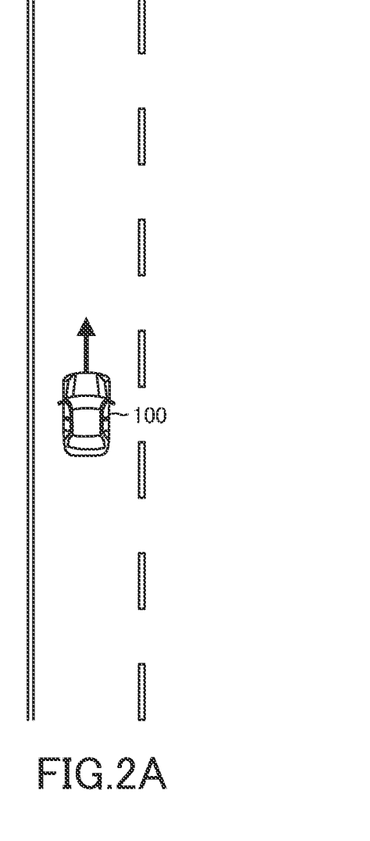
FIG. 2A is a view which shows a scene that a moving speed control is executed.

The moving speed control is a control executed when there is no preceding vehicle ahead of the own vehicle 100 as shown in FIG. 2A. The moving speed control is a control to autonomously control activations of the driving apparatus 20 and the braking apparatus 30, based on a difference between a moving speed V of the own vehicle 100 and a set speed Vset. The set speed Vset is the moving speed V of the own vehicle 100 set by a user of the own vehicle 100, in particular, a driver of the own vehicle 100. The vehicle moving apparatus 10 acquires the moving speed V of the own vehicle 100 from a vehicle moving speed detection device 45. The moving speed V of the own vehicle 100 is an index value expressing a moving state of the own vehicle 100.

Figure 2B:
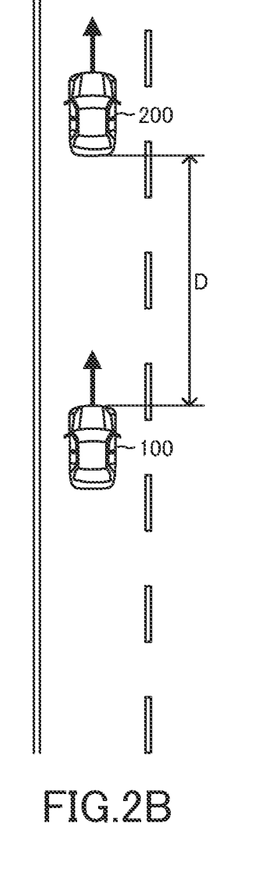
FIG. 2B is a view which shows a scene that an inter-vehicle distance control is executed.

The inter-vehicle distance control is a control executed when there is a preceding vehicle 200 ahead of the own vehicle 100 as shown in FIG. 2B. The inter-vehicle distance control is a control to autonomously control the activations of the driving apparatus 20 and the braking apparatus 30, based on a difference between an inter-vehicle distance D and a target inter-vehicle distance Dtgt. The inter-vehicle distance D is a distance between the own vehicle 100 and the preceding vehicle 200. The target inter-vehicle distance Dtgt is the inter-vehicle distance D set by the user of the own vehicle 100, in particular, the driver of the own vehicle 100. The inter-vehicle distance D is the index value expressing the moving state of the own vehicle 100.

Next, operations of the vehicle moving apparatus 10 will be described in detail. The vehicle moving apparatus 10 is configured to execute a routine shown in FIG. 3 with a predetermined calculation cycle. The vehicle moving apparatus 10 starts a process from a step S300 of the routine shown in FIG. 3 and proceeds with the process to a step S305 to determine whether a moving control execution condition C0 is satisfied. The moving control execution condition C0 is a condition that the moving control is requested to be executed. The user of the own vehicle 100, in particular, the driver of the own vehicle 100 can request the vehicle moving apparatus 10 to execute the moving control by operating a moving control request operator 51 such as a moving assistance button.

Figure 3:
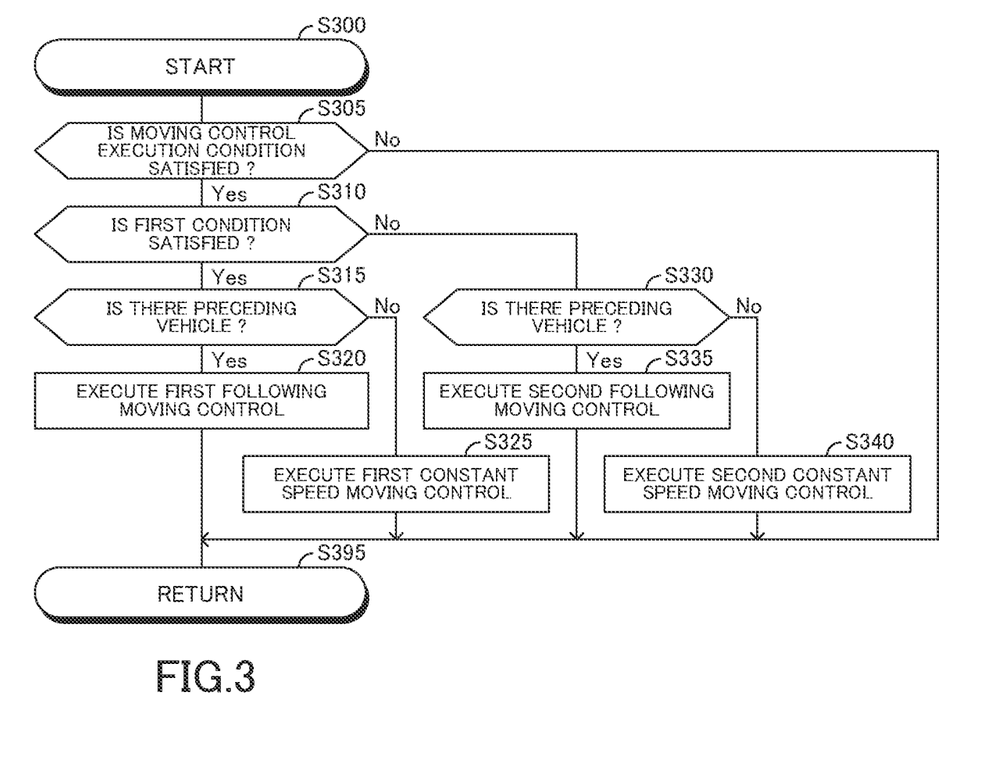
FIG. 3 is a view which shows a flowchart of a routine executed by the vehicle moving apparatus according to the embodiment of the invention.

When the vehicle moving apparatus 10 determines "Yes" at the step S305, the vehicle moving apparatus 10 proceeds with the process to a step S310 to determine whether a first condition C1 is satisfied. The first condition C1 is a condition that a second moving control or an economy moving control is not requested to be executed. The user of the own vehicle 100, in particular, the driver of the own vehicle 100 can request the vehicle moving apparatus 10 to execute the second moving control by operating a second moving control request operator 52 such as an economy moving button. In this embodiment, the second moving control includes a second moving speed control and a second inter-vehicle distance control described later.

When the vehicle moving apparatus 10 determines "Yes" at the step S310, the vehicle moving apparatus 10 executes a first moving control. In this embodiment, the first moving control includes a first moving speed control and a first inter-vehicle distance control described later.

In particular, when the vehicle moving apparatus 10 determines "Yes" at the step S310, the vehicle moving apparatus 10 proceeds with the process to a step S315 to determine whether there is the preceding vehicle 200. The vehicle moving apparatus 10 determines whether there is the preceding vehicle 200, based on surrounding detection information IS. The surrounding detection information IS is information provided form a surrounding information detection apparatus 60. In this embodiment, the surrounding information detection apparatus 60 includes radar sensors 61 and camera sensors 62. The surrounding information detection apparatus 60 provides the vehicle moving apparatus 10 with radar detection information, i.e., information on a situation around the own vehicle 100 acquired by the radar sensors 61 as the surrounding detection information IS. In addition, the surrounding information detection apparatus 60 provides the vehicle moving apparatus 10 with image information, i.e., image data on the situation around the own vehicle 100 acquired by the camera sensors 62 as the surrounding detection information IS.

When the vehicle moving apparatus 10 determines "Yes" at the step S315, the vehicle moving apparatus 10 proceeds with the process to a step S320 to execute the first inter-vehicle distance control. The first inter-vehicle distance control is a control to maintain the inter-vehicle distance D at the target inter-vehicle distance Dtgt. In particular, the first inter-vehicle distance control is a control to accelerate and decelerate the own vehicle 100 by autonomously controlling the activations of the driving apparatus 20 and the braking apparatus 30 so as to maintain the inter-vehicle distance D at the target inter-vehicle distance Dtgt. Therefore, the first inter-vehicle distance control is a so-called following moving control or a so-called adaptive cruise control. The vehicle moving apparatus 10 acquires the inter-vehicle distance D, based on the surrounding detection information IS, in particular, the radar detection information.

Then, the vehicle moving apparatus 10 proceeds with the process to a step S395 to terminate executing this routine once.

On the other hand, when the vehicle moving apparatus 10 determines "No" at the step S315, the vehicle moving apparatus 10 proceeds with the process to a step S325 to execute the first moving speed control. The first moving speed control is a control to maintain the moving speed V of the own vehicle 100 at the set speed Vset. In particular, the first moving speed control is a control to accelerate and decelerate the own vehicle 100 by autonomously controlling the activations of the driving apparatus 20 and the braking apparatus 30 so as to maintain the moving speed V of the own vehicle 100 at the set speed Vset. Therefore, the first moving speed control is a so-called constant speed moving control or a so-called cruise control.

Then, the vehicle moving apparatus 10 proceeds with the process to the step S395 to terminate executing this routine once.

Further, when the vehicle moving apparatus 10 determines "No" at the step S310, the vehicle moving apparatus 10 proceeds with the process to a step S330 to determine whether there is the preceding vehicle 200. That is, when a second condition C2 that the first condition C1 is not satisfied at the step S310 and thus, the second moving control or the economy moving control is requested to be executed, is satisfied, the vehicle moving apparatus 10 proceeds with the process to the step S330 to determine whether there is the preceding vehicle 200.

When the vehicle moving apparatus 10 determines "Yes" at the step S330, the vehicle moving apparatus 10 proceeds with the process to a step S335 to execute the second inter-vehicle distance control. The second inter-vehicle distance control is a control to maintain the inter-vehicle distance D within a predetermined distance range Rd including the target inter-vehicle distance Dtgt. In particular, the second inter-vehicle distance control is a control to accelerate the own vehicle 100 by controlling the activation of the driving apparatus 20 when the inter-vehicle distance D increases to an upper limit value of the predetermined distance range Rd and decelerate the own vehicle 100 by controlling the activation of the driving apparatus 20 when the inter-vehicle distance D decreases to a lower limit value of the predetermined distance range Rd. When the own vehicle 100 is requested to be accelerated, and the internal combustion engine 21 is activated while the second inter-vehicle distance control is executed, the vehicle moving apparatus 10 activates the driving apparatus 20 so as to output the power from the driving apparatus 20 at the greatest energy efficiency. In particular, when the own vehicle 100 is requested to be accelerated, and the internal combustion engine 21 is activated while the second inter-vehicle distance control is executed, the vehicle moving apparatus 10 activates the internal combustion engine 21 at an optimum activation point. The optimum activation point is an activation point at which the energy efficiency of the internal combustion engine 21 to output the power is greatest. The activation point is a point defined by a rotation speed of the internal combustion engine 21 and a load of the internal combustion engine 21. In this embodiment, the vehicle moving apparatus 10 may be configured to activate the internal combustion engine 21 at the activation point near the optimum activation point when the own vehicle 100 is requested to be accelerated, and the internal combustion engine 21 is activated while the second inter-vehicle distance control is executed. On the other hand, when the own vehicle 100 is requested to be decelerated while the second inter-vehicle distance control is executed, the vehicle moving apparatus 10 controls the activation of the internal combustion engine 21 so as to cause the own vehicle 100 to coast.

Then, the vehicle moving apparatus 10 proceeds with the process to the step S395 to terminate executing this routine once.

On the other hand, when the vehicle moving apparatus 10 determines "No" at the step S330, the vehicle moving apparatus 10 proceeds with the process to a step S340 to execute the second moving speed control. The second moving speed control is a control to maintain the moving speed V of the own vehicle 100 within a predetermined speed range Rv including the set speed Vset. In particular, the second moving speed control is a control to accelerate the own vehicle 100 by controlling the activation of the driving apparatus 20 when the moving speed V of the own vehicle 100 decreases to a lower limit value of the predetermined speed range Rv and decelerate the own vehicle 100 by controlling the activation of the own vehicle 100 when the moving speed V of the own vehicle 100 increases to an upper limit value of the predetermined speed range Rv. When the own vehicle 100 is requested to be accelerated, and the internal combustion engine 21 is activated while the second moving speed control is executed, the vehicle moving apparatus 10 activates the driving apparatus 20 so as to output the power from the driving apparatus 20 at the greatest energy efficiency. In particular, when the own vehicle 100 is requested to be accelerated, and the internal combustion engine 21 is activated while the second moving speed control is executed, the vehicle moving apparatus 10 activates the internal combustion engine 21 at the optimum activation point. In this embodiment, the vehicle moving apparatus 10 may be configured to activate the internal combustion engine 21 at the activation point near the optimum activation point when the own vehicle 100 is requested to be accelerated, and the internal combustion engine 21 is activated while the second moving speed control is executed. On the other hand, when the own vehicle 100 is requested to be decelerated while the second moving speed control is executed, the vehicle moving apparatus 10 controls the activation of the internal combustion engine 21 so as to cause the own vehicle 100 to coast.

Then, the vehicle moving apparatus 10 proceeds with the process to the step S395 to terminate executing this routine once.

Further, when the vehicle moving apparatus 10 determines "No" at the step S305, the vehicle moving apparatus 10 proceeds with the process directly to the step S395 to terminate executing this routine once.

Figure 4A:
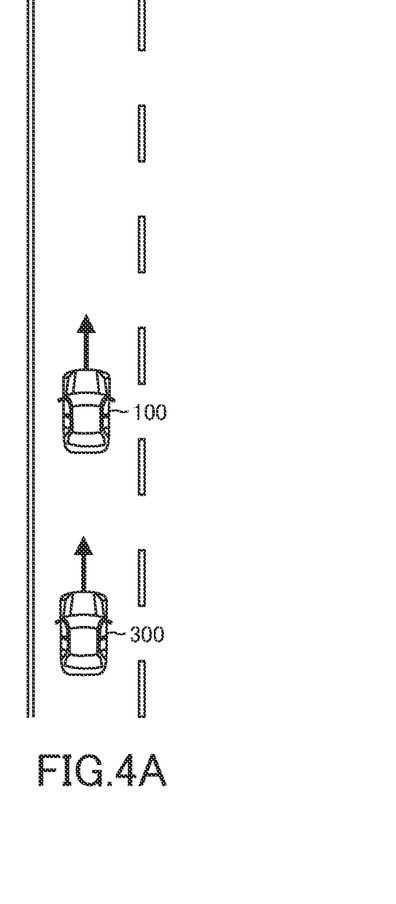
FIG. 4A is a view which shows a scene that the moving speed control is executed.

In this embodiment, when there is a following vehicle 300, and the second moving speed control is executed as shown in FIG. 4A, the vehicle moving apparatus 10 may be configured to set the predetermined speed range Rv so as to control the moving speed V at the suitable speed, based on a moving speed of the following vehicle 300 and/or a distance between the following vehicle 300 and the own vehicle 100.

Figure 4B:
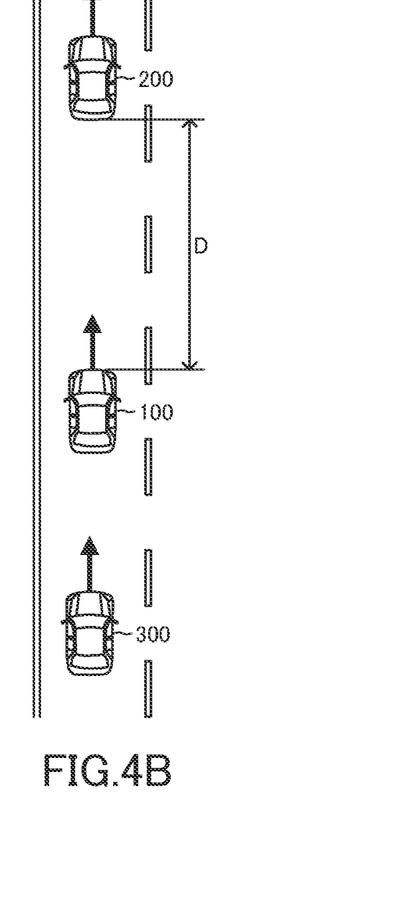
FIG. 4B is a view which shows a scene that the inter-vehicle distance control is executed.

Similarly, when there is the following vehicle 300, and the second inter-vehicle distance control is executed as shown in FIG. 4B, the vehicle moving apparatus 10 may be configured to set the predetermined distance range Rd so as to control the inter-vehicle distance D at the suitable distance, based on the moving speed of the following vehicle 300 and/or the distance between the following vehicle 300 and the own vehicle 100.

In this embodiment, the vehicle moving apparatus 10 activates or deactivates the internal combustion engine 21, depending on the requested power Preq. Next, a control of the internal combustion engine 21 by the vehicle moving apparatus 10 will be described in detail. In this embodiment, the requested power Preq is the power requested for the driving apparatus 20 to output.

Figure 5:
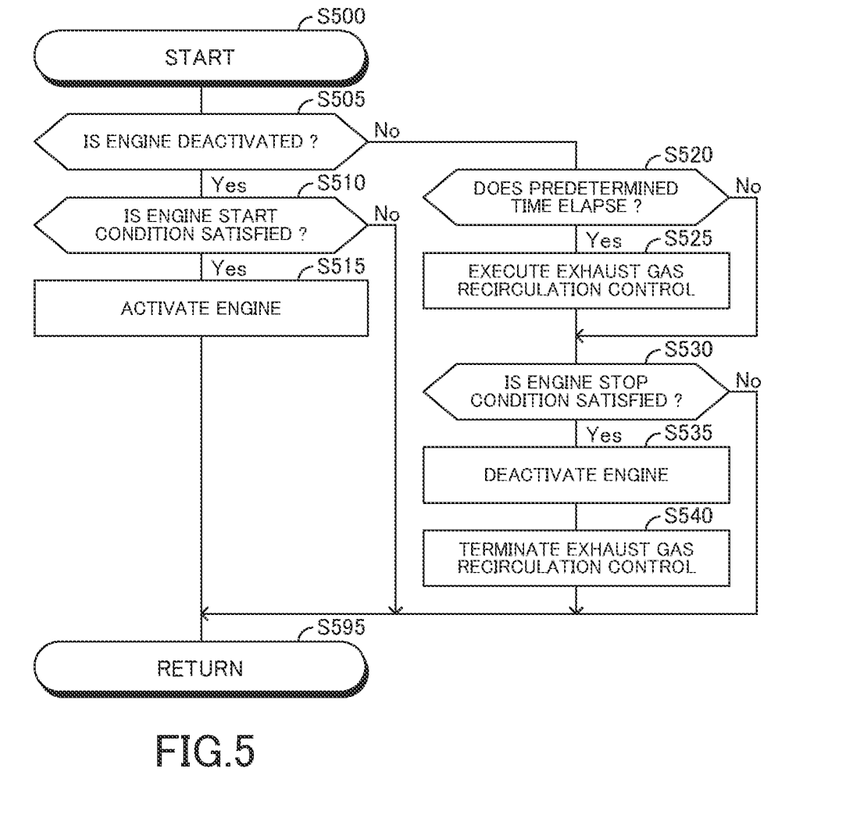
FIG. 5 is a view which shows a flowchart of a routine executed by the vehicle moving apparatus according to the embodiment of the invention.

The vehicle moving apparatus 10 is configured to execute a routine shown in FIG. 5 with the predetermined calculation cycle. The vehicle moving apparatus 10 starts a process from a step S500 of the routine shown in FIG. 5 and proceeds with the process to a step S505 to determine whether the internal combustion engine 21 is deactivated.

When the vehicle moving apparatus 10 determines "Yes" at the step S505, the vehicle moving apparatus 10 proceeds with the process to a step S510 to determine whether an engine start condition Cstart is satisfied. The engine start condition Cstart is a condition that the requested power Preq is equal to or greater than a predetermined value or an engine start determination value Pstart. In this embodiment, the engine start determination value Pstart is greater than zero.

When the vehicle moving apparatus 10 determines "Yes" at the step S510, the vehicle moving apparatus 10 proceeds with the process to a step S515 to start to activate the internal combustion engine 21. In this case, the vehicle moving apparatus 10 activates the internal combustion engine 21 and the electric motor 22 so as to control a total of an engine power (i.e., the power output from the internal combustion engine 21) and a motor power (i.e., the power output from the electric motor 22) to the requested power Preq. In this case, the power is output from the internal combustion engine 21 and the electric motor 22 or only from the internal combustion engine 21, depending on the requested power Preq.

Then, the vehicle moving apparatus 10 proceeds with the process to a step S595 to terminate executing this routine once.

On the other hand, when the vehicle moving apparatus 10 determines "No" at the step S505, the vehicle moving apparatus 10 proceeds with the process to a step S520 to determine whether a predetermined time Tth elapses since the vehicle moving apparatus 10 starts to activate the internal combustion engine 21 at the step S515. Since this routine is executed with the predetermined calculation cycle, the time determination at step S520 relates to engine activation that occurred during a previous execution of the routine. In this regard, the vehicle moving apparatus 10 may be configured to determine whether an exhaust gas recirculation rate is equal to or greater than a predetermined circulation rate at the step S520 instead of the time-based determination. The exhaust gas circulation rate is a rate of a circulated exhaust gas amount relative to a total amount of a gas flowing into combustion chambers of the internal combustion engine 21. The circulated exhausted gas amount is an amount of an exhaust gas introduced into the combustion chambers of the internal combustion engine 21 by an exhaust gas recirculation control.

When the vehicle moving apparatus 10 determines "Yes" at the step S520, the vehicle moving apparatus 10 proceeds with the process to a step S525 to execute the exhaust gas recirculation control. Then, the vehicle moving apparatus 10 proceeds with the process to a step S530. The exhaust gas recirculation control is a control to introduce the exhaust gas into the combustion chambers of the internal combustion engine 21 by introducing the exhaust gas discharged from the internal combustion engine 21 to an intake passage of the internal combustion engine 21. While the exhaust gas recirculation control is executed, the vehicle moving apparatus 10 controls the amount of the exhaust gas introduced into the combustion chambers of the internal combustion engine 21 by controlling an opening degree of an exhaust gas recirculation valve 71 of an exhaust gas recirculation device 70.

On the other hand, when the vehicle moving apparatus 10 determines "No" at the step S520, the vehicle moving apparatus 10 proceeds with the process directly to the step S530.

When the vehicle moving apparatus 10 proceeds with the process to the step S530, the vehicle moving apparatus 10 determines whether an engine stop condition Cstop is satisfied. The engine stop condition Cstop is a condition that the requested power Preq is equal to or smaller than a predetermined value or an engine stop determination value Pstop. In this embodiment, the engine stop determination value Pstop is greater than zero. Further, the engine stop determination value Pstop is smaller than the engine start determination value Pstart.

When the vehicle moving apparatus 10 determines "Yes" at the step S530, the vehicle moving apparatus 10 proceeds with the process to a step S535 to deactivate the internal combustion engine 21. In this case, the electric motor 22 is activated such that the motor power, i.e., the power output from the electric motor 22, is controlled to the requested power Preq. That is, in this case, the power is output only from the electric motor 22.

Then, the vehicle moving apparatus 10 proceeds with the process to the step S595 to terminate executing this routine once.

On the other hand, when the vehicle moving apparatus 10 determines "No" at the step S530, the vehicle moving apparatus 10 proceeds with the process directly to the step S595 to terminate executing this routine once.

In this embodiment, when the own vehicle 100 is requested to be accelerated while the first moving control is executed, the vehicle moving apparatus 10 calculates the requested power Preq, based on the moving speed V of the own vehicle 100 and controls the activation of the driving apparatus 20 so as to output the power corresponding to the requested power Preq from the driving apparatus 20. In this case, the requested power Preq increases as the moving speed V of the own vehicle 100 increases.

Also, when the own vehicle 100 is requested to be accelerated while the second moving control is executed, the vehicle moving apparatus 10 calculates the requested power Preq, based on the moving speed V of the own vehicle 100 and controls the activation of the driving apparatus 20 so as to output the power corresponding to the requested power Preq from the driving apparatus 20. In this case, the requested power Preq increases as the moving speed V of the own vehicle 100 increases.

Further, while neither the first moving control nor the second moving control is executed, the vehicle moving apparatus 10 determines the requested power Preq, based on an operation amount of an accelerator pedal 41 and the moving speed V of the own vehicle 100 and controls the activation of the driving apparatus 20 so as to output the power corresponding to the requested power Preq from the driving apparatus 20. The vehicle moving apparatus 10 acquires the operation amount of the accelerator pedal 41 by an accelerator pedal operation amount sensor 42. Furthermore, while neither the first moving control nor the second moving control is executed, the vehicle moving apparatus 10 determines a requested braking force, based on an operation amount of a brake pedal 43 and controls the activation of the braking apparatus 30 so as to apply a braking force corresponding to the requested braking force by the hydraulic brake apparatus 31. The vehicle moving apparatus 10 acquires the operation amount of the brake pedal 43 by a brake pedal operation amount sensor 44.

Figure 6:
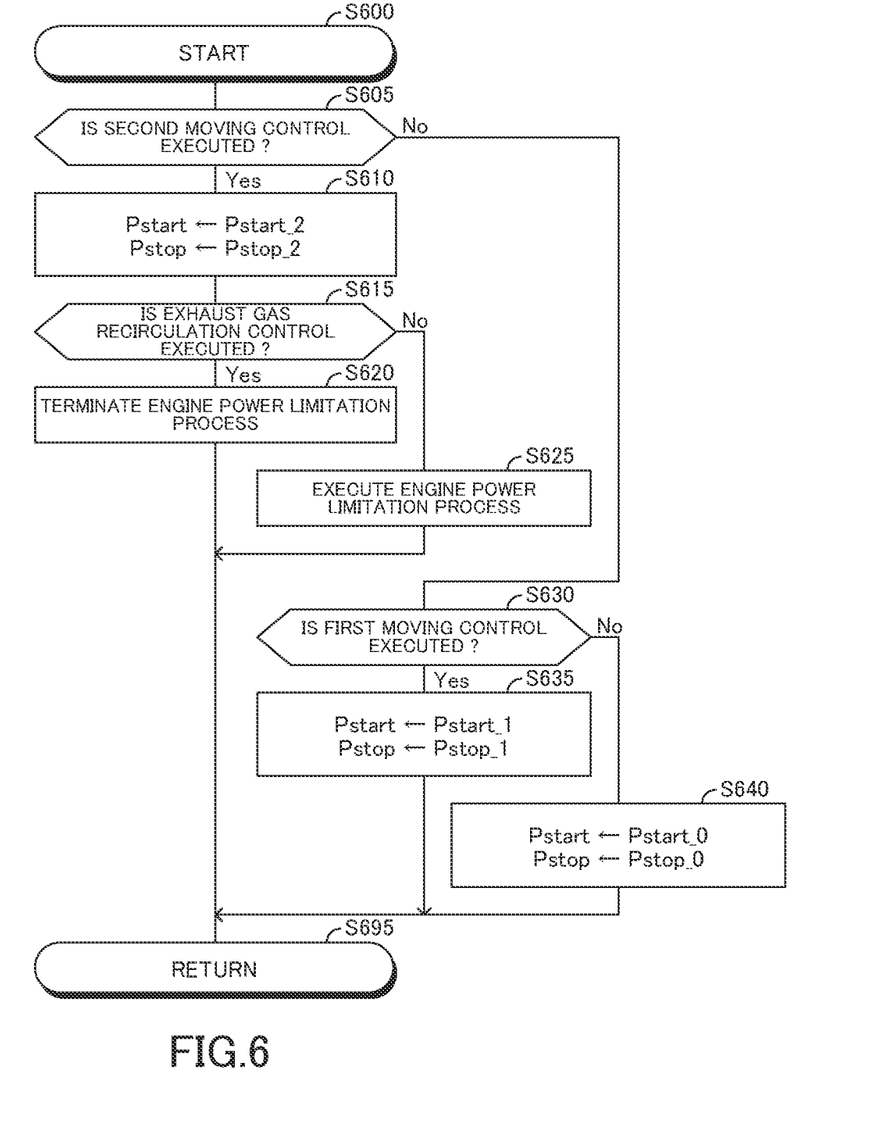
FIG. 6 is a view which shows a flowchart of a routine executed by the vehicle moving apparatus according to the embodiment of the invention.

Further, the vehicle moving apparatus 10 is configured to execute a routine shown in FIG. 6 to set the engine start determination value Pstart and the engine stop determination value Pstop with the predetermined calculation cycle. The vehicle moving apparatus 10 starts a process from a step S600 of the routine shown in FIG. 6 and proceeds with the process to a step S605 to determine whether the second moving control is executed.

When the vehicle moving apparatus 10 determines "No" at the step S605, the vehicle moving apparatus 10 proceeds with the process to a step S630 to determine whether the first moving control is executed.

When the vehicle moving apparatus 10 determines "No" at the step S630, that is, nether the first moving control nor the second moving control is executed, the vehicle moving apparatus 10 proceeds with the process to a step S640 to set a base start determination value Pstart_0 as the engine start determination value Pstart and set a base stop determination value Pstop_0 as the engine stop determination value Pstop. Then, the vehicle moving apparatus 10 proceeds with the process to a step S695 to terminate executing this routine once.

On the other hand, when the vehicle moving apparatus 10 determines "Yes" at the step S630, that is, the first moving control is executed, the vehicle moving apparatus 10 proceeds with the process to a step S635 to set a first start determination value Pstart_1 as the engine start determination value Pstart and set a first stop determination value Pstop_1 as the engine stop determination value Pstop. In this embodiment, the first start determination value Pstart_1 is smaller than the base start determination value Pstart_0. Then, the vehicle moving apparatus 10 proceeds with the process to the step S695 to terminate executing this routine once.

Further, when the vehicle moving apparatus 10 determines "Yes" at the step S605, that is, the second moving control is executed, the vehicle moving apparatus 10 proceeds with the process to a step S610 to set a second start determination value Pstart_2 as the engine start determination value Pstart and set a second stop determination value Pstop_2 as the engine stop determination value Pstop. In this embodiment, the second start determination value Pstart_2 is smaller than the first start determination value Pstart_1.

Then, the vehicle moving apparatus 10 proceeds with the process to a step S615 to determine whether the exhaust gas recirculation control is executed.

When the vehicle moving apparatus 10 determines "No" at the step S615, the vehicle moving apparatus 10 proceeds with the process to a step S625 to execute an engine power limitation process. The engine power limitation process is a process to limit the engine power to a value equal to or smaller than a predetermined value or a predetermined upper limit value.

The predetermined upper limit value may be constant or set, based on the moving state such as the inter-vehicle distance D. In case where the predetermined upper limit value is set, based on the inter-vehicle distance D, the predetermined upper limit value is set to a small value when the inter-vehicle distance D is smaller than a predetermined value or a predetermined inter-vehicle distance, compared with when the inter-vehicle distance D is equal to or greater than the predetermined inter-vehicle distance. Further, the predetermined upper limit value may be set, based on the moving state such as whether the own vehicle 100 moves on a downward slope. In a case where the predetermined upper limit value is set, based on whether the own vehicle 100 moves on the downward slope, the predetermined upper limit value is set to a small value when the own vehicle 100 moves on the downward slope, compared with when the own vehicle 100 does not move on the downward slope. Furthermore, the predetermined upper limit value may be set, based on the moving state such as a relative speed of the preceding vehicle 200 to the own vehicle 100 or an acceleration rate of the preceding vehicle 200. In a case where the predetermined upper limit value is set, based on the relative speed of the preceding vehicle 200 to the own vehicle 100, the predetermined upper limit value is set to a small value when the relative speed of the preceding vehicle 200 to the own vehicle 100 is smaller than a predetermined value or a predetermined relative speed, compared with when the relative speed of the preceding vehicle 200 to the own vehicle 100 is equal to or greater than the predetermined relative speed. Further, in a case where the predetermined upper limit value is set, based on the acceleration rate of the preceding vehicle 200, the predetermined upper limit value is set to a small value when the acceleration rate of the preceding vehicle 200 is smaller than a predetermined value or a predetermined acceleration rate, compared with when the acceleration rate of the preceding vehicle 200 is equal to or greater than the predetermined acceleration rate.

When the inter-vehicle distance D is small, or the own vehicle 100 moves on the downward slope, or the relative speed of the preceding vehicle 200 to the own vehicle 100 is small, or the acceleration rate of the preceding vehicle 200 is small, a probability that the own vehicle 100 is accelerated by an optimum acceleration control for a long time, is small. Therefore, the small engine power is enough to accelerate the own vehicle 100. In this regard, when the engine power is decreased, the energy efficiency of the internal combustion engine 21 is improved.

Therefore, when the probability that the own vehicle 100 is accelerated by the optimum acceleration control for a long time, is small, the engine power becomes small by setting the predetermined upper limit value, based on the moving state of the own vehicle 100. Thus, the energy efficiency of the internal combustion engine 21 can be improved.

After the vehicle moving apparatus 10 executes a process of the step S625, the vehicle moving apparatus 10 proceeds with the process to the step S695 to terminate executing this routine once.

On the other hand, when the vehicle moving apparatus 10 determines "Yes" at the step S615, the vehicle moving apparatus 10 proceeds with the process to a step S620 to terminate executing the engine power limitation process. Then, the vehicle moving apparatus 10 proceeds with the process to the step S695 to terminate executing this routine once.

With the vehicle moving apparatus 10, the following advantages can be obtained. When the requested power Preq increases to the engine start determination value Pstart, the internal combustion engine 21 starts to be activated. On the other hand, when the requested power Preq decreases to the engine stop determination value Pstop, the internal combustion engine 21 is deactivated. In this regard, if the engine start determination value Pstart and the engine stop determination value Pstop are equal, an activation and a deactivation of the internal combustion engine 21 are frequently switched. This is not preferred. With the vehicle moving apparatus 10, the engine start determination value Pstart is greater than the engine stop determination value Pstop. That is, there is a hysteresis between the engine start determination value Pstart and the engine stop determination value Pstop. Thereby, a frequency of switching between the activation and the deactivation of the internal combustion engine 21 is reduced.

The frequency of the switching between the activation and the deactivation of the internal combustion engine 21 can be reduced by increasing the hysteresis. Therefore, when the engine stop determination value Pstop is constant, the hysteresis can be increased by increasing the engine start determination value Pstart.

However, when the engine start determination value Pstart is great, the internal combustion engine 21 is kept deactivated, and the power corresponding to the requested power Preq is output only by the electric motor 22 until the requested power Preq reaches the engine start determination value Pstart although the power to move the own vehicle 100 can be output at the great energy efficiency by activating the internal combustion engine 21 at the optimum activation point. In this case, the energy efficiency of the driving apparatus 20 is low, compared with when the internal combustion engine 21 is activated.

On the other hand, when the own vehicle 100 is accelerated or decelerated by the second moving control, the requested power Preq changes to a small extent. Thus, the frequency of the switching between the activation and the deactivation of the internal combustion engine 21, can be within a permitted range.

With the own vehicle 100, when the second moving control is executed, the engine start determination value Pstart is small, compared with when the second moving control is not executed. Thus, the internal combustion engine 21 starts to be activated when the requested power Preq is small. Therefore, the own vehicle 100 is prevented from being moved only by the motor power when the requested power Preq is relatively great. Thus, the power to move the own vehicle 100 can be output at the high energy efficiency.

It should be noted that the invention is not limited to the aforementioned embodiments, and various modifications can be employed within the scope of the invention.

What is claimed is:

1. A vehicle moving apparatus, comprising an electronic control unit configured to execute a moving control to autonomously move a vehicle by controlling a power output from an internal combustion engine and an electric motor, the moving control being a control to control the power from at least one of the internal combustion engine, the electric motor, or both the internal combustion engine and the electric motor to maintain an index value expressing a moving state of the vehicle within a predetermined range and decelerate the vehicle by causing the vehicle to coast when the vehicle is requested to be decelerated, wherein the electronic control unit is configured to:
when the vehicle is requested to be accelerated while the moving control is not executed,
accelerate the vehicle by keeping the internal combustion engine deactivated and activating the electric motor while a requested power is smaller than a first start determination value, and
start to activate the internal combustion engine to accelerate the vehicle when the requested power reaches the first start determination value; and
when the vehicle is requested to be accelerated while the moving control is executed,
accelerate the vehicle by keeping the internal combustion engine deactivated and activating the electric motor while the requested power is smaller than a second start determination value, and
start to activate the internal combustion engine to accelerate the vehicle when the requested power reaches the second start determination value, and
wherein the second start determination value is smaller than the first start determination value.

2. The vehicle moving apparatus as set forth in claim 1, wherein the electronic control unit is configured to limit the power output from the internal combustion engine to a value equal to or smaller than a predetermined upper limit value until the electronic control unit starts to execute an exhaust gas recirculation control to recirculate an exhaust gas to the internal combustion engine after the electronic control unit starts to activate the internal combustion engine while the moving control is executed.

3. The vehicle moving apparatus as set forth in claim 2, wherein the predetermined upper limit value is set, based on the moving state of the vehicle.

4. The vehicle moving apparatus as set forth in claim 3, wherein the moving state includes information on an inter-vehicle distance which is a distance between the vehicle and a preceding vehicle, and
wherein the predetermined upper limit value set when the inter-vehicle distance is smaller than a predetermined inter-vehicle distance, is smaller than the predetermined upper limit value set when the inter-vehicle distance is equal to or greater than the predetermined inter-vehicle distance.

5. The vehicle moving apparatus as set forth in claim 3, wherein the moving state includes information on whether the vehicle moves along a downward slope, and
wherein the predetermined upper limit value set when the vehicle moves on the downward slope, is smaller than the predetermined upper limit value set when the vehicle does not move on the downward slope.

6. The vehicle moving apparatus of claim 1, wherein the index value expressing the moving state of the vehicle includes a moving speed of the vehicle when there is no preceding vehicle ahead of the vehicle, and an inter-vehicle distance between the vehicle and a preceding vehicle when there is a preceding vehicle ahead of the vehicle.

7. The vehicle moving apparatus of claim 1, wherein the electronic control unit is configured to execute the moving control by controlling the activation of the driving apparatus and a braking apparatus based on a difference between the index value and a target value, and
wherein the electronic control unit is configured to autonomously control the activations of the driving apparatus and the braking apparatus to maintain the index value within the predetermined range.

8. The vehicle moving apparatus of claim 1, wherein the electronic control unit is configured to calculate the requested power based on a moving speed of the vehicle when the vehicle is requested to be accelerated, and control an activation of the driving apparatus to output power corresponding to the requested power from the driving apparatus.

* * * * *